(12) United States Patent
Le Salver et al.

(10) Patent No.: US 8,731,878 B2
(45) Date of Patent: May 20, 2014

(54) METHOD FOR PREDICTING THE NOISE/COMFORT PERFORMANCE OF A VEHICLE TRAVELLING ON UNEVEN GROUND

(75) Inventors: Robert Le Salver, Clermont-Ferrand (FR); Françoise Le Salver, legal representative, Chanteloup les Vignes (FR); Clarisse Le Salver, legal representative, Paris (FR); Annig Le Salver, legal representative, Rome (IT); Vincent Le Salver, legal representative, Paris (FR); Jean-Francois Beniguel, Chamalieres (FR); Marc Duvernier, Clermont-Ferrand (FR); David Payet, Cebazat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 870 days.

(21) Appl. No.: 12/990,088

(22) PCT Filed: Apr. 28, 2009

(86) PCT No.: PCT/EP2009/055144
§ 371 (c)(1),
(2), (4) Date: Sep. 2, 2011

(87) PCT Pub. No.: WO2009/133113
PCT Pub. Date: Nov. 5, 2009

(65) Prior Publication Data
US 2012/0035894 A1 Feb. 9, 2012

(30) Foreign Application Priority Data
Apr. 30, 2008 (FR) ...................... 08 52940

(51) Int. Cl.
*G06F 17/10* (2006.01)
*G06G 7/48* (2006.01)
*G01M 15/00* (2006.01)
*G06F 7/60* (2006.01)

(52) U.S. Cl.
USPC .............. 703/2; 703/8; 73/117.01; 73/117.03

(58) Field of Classification Search
USPC ........... 703/1, 2, 6, 8; 73/11.04, 11.07, 12.01, 73/117.02, 117.03, 128, 146; 701/36, 37, 701/48, 91; 188/2 R, 4 R, 17
See application file for complete search history.

(56) References Cited

U.S. PATENT DOCUMENTS

| | | | |
|---|---|---|---|
| 7,454,964 B2 * | 11/2008 | Flament et al. ................. | 73/146 |
| 2002/0111718 A1 | 8/2002 | Dormegnie et al. ............ | 701/1 |
| 2007/0179679 A1 | 8/2007 | Flament et al. .................. | 701/1 |
| 2009/0127976 A1 * | 5/2009 | Ward et al. .................... | 310/319 |

FOREIGN PATENT DOCUMENTS

| | | |
|---|---|---|
| EP | 0 886 130 A2 | 12/1998 |
| EP | 1 200 808 B1 | 10/2004 |
| WO | WO 2005/071385 A1 | 8/2005 |

OTHER PUBLICATIONS

Gerdes et al. (Safety performance and robustness of heavy vehicle AVCS, 2002 (72 pages).*

* cited by examiner

*Primary Examiner* — Mary C Jacob
*Assistant Examiner* — Andre Pierre Louis
(74) *Attorney, Agent, or Firm* — Fitzpatrick, Cella, Harper & Scinto (57) ABSTRACT

A method is presented for predicting a noise/comfort performance in a cabin of a vehicle with a body-shell and a suspension system linked to the body-shell by at least one point of attachment, with the vehicle rolling at a given speed on a rolling device with a macrorough rolling surface. The method includes: determining a global transfer function of the body-shell, determining a global admittance of the body-shell, determining an impedance of the suspension system, determining, while rolling on the macrorough rolling surface, lockup loads of the suspension system, and combining together the global transfer function of the body-shell, the global admittance of the body-shell, the impedance of the suspension system, and the lockup loads of the suspension system to obtain a prediction of noise/comfort performance (P) inside the cabin.

17 Claims, 10 Drawing Sheets

METHOD FOR PREDICTING THE NOISE/COMFORT PERFORMANCE OF A VEHICLE TRAVELLING ON UNEVEN GROUND

The present application is a national-stage 35 U.S.C. 371 of International Patent Application No. PCT/EP2009/055144, filed on Apr. 28, 2009, which claims foreign priority under 35 U.S.C. §119(a)-(d) of French Application No. 08/52940 filed on Apr. 30, 2008.

FIELD OF THE INVENTION

The invention relates to a method for predicting the acoustic and vibratory levels inside a vehicle rolling over a ground surface exhibiting one or more types of unevenness.

TECHNOLOGICAL BACKGROUND

The discomfort felt by the driver and the passengers of a vehicle when rolling over one or more obstacles (such as, for example, manhole covers, asphalt joins, diverse joints, gravel, etc.) entails two distinct aspects. A first aspect is of a vibratory nature and is manifested by vibrations of the floor of the vehicle, the seats, and the steering wheel. A second aspect is of an acoustic nature and is manifested by the noise created inside the vehicle by the vibrations of the various parts of the vehicle. The level of discomfort felt by the occupants of the vehicle depends in particular on the body-shell, on the suspension system, on the rolling speed, and, of course, on the type of obstacle on the ground surface.

Several methods are known to a person skilled in the art with a view to evaluating the noise/comfort performance of a new suspension system for a given vehicle and allowing him to optimize the suspension system. The optimization includes obtaining characteristics of a suspension system that affords a substantially improved noise/comfort level.

For example, with a view to evaluating and optimizing the noise/comfort performance of a vehicle equipped with a new suspension system, a person skilled in the art can implement an experimental method consisting of carrying out measurements of noise and vibrations in the cabin of a vehicle rolling on a portion of road or track, making it possible to reveal a discomfort of a vibratory nature and/or an acoustic nature in the vehicle, with this portion of road or track including on its surface one or more irregularities. However, this method requires the availability of a vehicle for evaluating various suspension systems; furthermore, it may be driven only under favourable meteorological conditions, thereby inducing a sometimes excessively lengthy vehicle immobilization time and consequently a cost overrun when fine-tuning a suspension system, since numerous iterations are often necessary. It is furthermore lengthy and irksome for the operator and prone to large measurement scatter.

According to an alternative, document EP 0 886 130 B1 describes a method for predicting the noise level in the cabin of a vehicle equipped with tyres and rolling over uneven ground exhibiting a plurality of irregularities. According to this method, a global transfer function of a vehicle (also referred to as "vehicle transfer function") equipped with tyres is determined by directly applying to each axle (at the wheel centre) of the vehicle, when stationary, loads directed along predetermined directions (in the form of knocks). A sound recording is made inside the vehicle for each impact and this operation is repeated successively for each of the front and rear positions and for each side of the vehicle. In another test, an identical tyre rolls on a flywheel, which is provided on its rolling surface with a plurality of irregularities simulating uneven ground. In this test, the tyre is mounted with a fixed axis, and the resulting lockup loads at the wheel centre are recorded. The measured lockup loads are employed as input for a model involving the vehicle transfer function, determined as mentioned above, so as to obtain the resulting noise level inside the vehicle. This method has limits, however. In particular, for any change of a tire and wheel assembly of the vehicle it is necessary to repeat the determination of the vehicle's global transfer function.

Moreover, because the vehicle transfer function is established on the basis of trials carried out when stationary, no account is taken of the mechanical characteristics of the tyres while rolling, which, as a general rule, are substantially different from the same characteristics when stationary. It is in particular known that the vertical rigidity under dynamic stressing of a tyre when stationary is greater than the same vertical rigidity under dynamic stressing of a rolling tyre.

According to another alternative, document EP 1 200 808 B1 describes a method for predicting the noise/comfort performance of a vehicle consisting of a body-shell equipped with a suspension system and rolling over uneven ground exhibiting a plurality of irregularities. Two procedures are undertaken in this method. First of all, acoustic and vibratory measurements are performed inside the cabin of the vehicle when the suspension system is in a rolling condition, rolling over ground exhibiting one or more irregularities or types of unevenness. A second procedure includes placing the suspension system, at the levels of the points of attachment, on a rigid rig. The suspension system is in a rolling condition in a manner analogous to the first procedure (loading, pressure, speed). The rigid rig is equipped with a system for measuring the lockup loads at the level of each point of attachment of the suspension system. In the course of this second procedure, the signals of force and of moment at each point of attachment of the suspension system are recorded. The vehicle transfer function is determined by the ratio of the acoustic and vibratory level inside the vehicle and the suspension system lockup load level. For the same body-shell equipped with a prototype suspension system, it is possible to predict the acoustic and vibratory level inside the vehicle when the prototype suspension system rolls over uneven ground exhibiting one or more irregularities. By placing the prototype suspension system on the rigid rig at the levels of these points of attachment, the prototype suspension system rolls as if it was rolling over uneven ground identical to that of the on-vehicle trial (i.e., as if using an actual vehicle). The lockup loads at the levels of the points of attachment are measured. By multiplying the vehicle transfer function by these lockup loads of the prototype suspension system, the acoustic and vibratory level of the body-shell furnished with the prototype suspension system rolling over uneven ground is evaluated. This method also has limits that can, for suspension systems of different structure, for example, at the level of a structure of a tyre of identical dimension, provide different noise levels from those obtained on the basis of trials carried out with an actual vehicle equipped with these various suspension systems and rolling over uneven ground.

In particular, the vehicle transfer function is determined for a reference suspension system. This reference suspension system has its own mechanical behaviour, which influences the vehicle transfer function. A prototype suspension system has its own mechanical behaviour, which may influence the vehicle transfer function in a different manner.

Finally, document WO 2005/071385 A1 describes a method for determining operational loads at the wheel centre between the suspension system, reduced to its simple tire and wheel assembly, and the body-shell. These operational loads determine a new vehicle transfer function, making it possible to predict the noise/comfort performance of a vehicle furnished with this tire and wheel assembly rolling over uneven ground exhibiting a plurality of irregularities.

In a first step, a measurement of lockup loads of the tire and wheel assembly is carried out on a rollway furnished with uneven ground exhibiting a plurality of irregularities. This rollway is equipped with a dynamometric hub for measuring the lockup loads at the wheel centre in three perpendicular directions corresponding to the vehicle's reference frame. When the tire and wheel assembly rolls over uneven ground, the lockup loads resulting from this rolling are recorded with the aid of the dynamometric hub.

A functional model of the suspension system is thereafter determined, in a second step, characterized by non-suspended masses as well as stiffnesses and dampers in the three directions of the vehicle reference frame.

Conventionally, this functional model is defined in the directions of the vehicle's reference frame and the couplings between the perpendicular directions are neglected. Moreover, only forces in the three perpendicular directions are taken into account. The identification of the parameters of this functional model is performed by measurements on the vehicle. By linking this functional model of the suspension system to a model of the tyre, a switching matrix (Hp) for switching between lockup loads and operational loads at the wheel centre is determined. The estimation of the operational loads at the wheel centre of the tire and wheel assembly is obtained by multiplying the switching matrix (Hp) by the lockup loads in the first step.

In a third step, acoustic and vibratory measurements are performed inside the cabin of the vehicle when the tire and wheel assembly is rolling over ground exhibiting a plurality of obstacles.

In a fourth step, a new vehicle transfer function is determined by using a ratio of the acoustic and vibratory level inside the vehicle and a level of operational loads of the tire and wheel assembly.

For the same body-shell equipped with a prototype tire and wheel assembly, it is possible to predict the acoustic and vibratory level inside the vehicle when the vehicle furnished with this prototype tire and wheel assembly rolls over uneven ground having several irregularities. By placing the prototype tire and wheel assembly on the rigid rig at a level of the wheel centre, the tire and wheel assembly rolls as if rolling over uneven ground identical to that of the on-vehicle trial. Lockup loads at the level of the wheel centre are measured. By multiplying the switching matrix (Hp) by the lockup loads, operational loads of the tire and wheel assembly at the wheel centre are evaluated. By multiplying the vehicle transfer function by these operational loads of the prototype tire and wheel assembly, the acoustic and vibratory level of the vehicle rolling over uneven ground is evaluated.

DEFINITIONS

Hereinafter, the following definitions apply:
"noise/comfort performance" is a vibroacoustic level, that is, an acoustic level and/or a vibratory level, measurable inside a vehicle rolling on a carriageway or road (or on a trial test surface) provided with at least one obstacle of determined or known dimension;
"suspension system" is a set of elements of the vehicle ensuring a linkage between one or more surfaces of contact between the vehicle and the carriageway and one or more points of the vehicle; in all cases, the suspension system includes at least a tire and wheel assembly;
"tire and wheel assembly" is an assembly that includes a tyre and its mounting wheel;
"body-shell" is the set of elements of the vehicle complementary to the suspension system;
"point of attachment" is a point that links the suspension system to the body-shell;
"vehicle reference frame" is a right-handed, orthonormal reference frame in which an X direction corresponds to a longitudinal direction of the vehicle directed from its rear to its front, a Z direction is orthogonal to the ground and directed upwards, and a Y direction is perpendicular to the X and Z directions to form the right-handed reference frame;
"global transfer function of the vehicle" is a function that includes two parts. The first part relates to noise in a cabin of the vehicle, and the second part relates to vibrations at certain predetermined points in the same cabin for an excitation at a point of attachment of the suspension system to the body-shell of the vehicle;
"global transfer function of the body-shell" is a function that includes two parts. The first part relates to noise in a cabin of the body-shell, and the second part relates to vibrations at certain predetermined points in the same cabin for an excitation at a point of attachment of the suspension system to the body-shell;
"admittance at the point of attachment of the body-shell" is a function that relates a vibratory level of "k" point(s) of attachment of the body-shell to a predetermined unit exterior excitation at the "k" point(s) of attachment on the body-shell. It is at most a 6 k*6 k matrix, which links translational and rotational accelerations to loads and moments at a level or levels of the point(s) of attachment of the body-shell. This matrix is expressed in the vehicle reference frame;
"impedance at the point of attachment of the suspension system" is a function that links a level or levels of load and of moment of the "k" point(s) of attachment of the suspension system to a predetermined unit vibratory excitation of the "k" point(s) of attachment. It is at most a 6 k*6 k matrix, which links forces and moments to translational and rotational accelerations at the level or levels of the point(s) of attachment of the suspension system. This matrix is expressed in the vehicle reference frame;
"lockup loads at the point of attachment" are forces and moments at the point of attachment of the vehicle resulting from a zero displacement, in translation and rotation, of this point of attachment, when the suspension system is subjected to exterior loads linked with rolling over ground exhibiting at least one obstacle of determined dimension. These loads are expressed in the vehicle reference frame; and
"operational loads at the point of attachment" are forces and moments at the point of attachment of the vehicle resulting from the displacement, in translation and rotation, of this point of attachment on the vehicle, under in-service conditions, when the suspension system is subjected to exterior loads linked with rolling over ground exhibiting at least one obstacle of determined dimension. These loads are expressed in the vehicle reference frame.

SUMMARY OF THE INVENTION

In the method of document WO 2005/071385, determination of a functional model of a suspension system is one of the limits of this method. This functional model does not assume any coupling between perpendicular directions, and identification of parameters of the model is not easy. Thereafter, this method takes into account only forces in the three orthogonal directions of a vehicle's reference frame; it is recognized, however, that moments also need to be taken into account.

An aspect of the present invention is directed to a method for predicting a noise/comfort performance of a vehicle equipped with a suspension system that does not exhibit the drawbacks of the methods discussed above.

With this aim, there is proposed a method for predicting a noise/comfort performance corresponding to an acoustic level and/or a vibratory level in a cabin of a vehicle with a body-shell and a suspension system linked to the body-shell by at least one point of attachment, when the vehicle is rolling at a given speed V on a rolling device that includes on its rolling surface at least one irregularity of a predetermined dimension. The method includes:

determining a global transfer function of the body-shell expressed from a point of attachment to the cabin ($T_{body\text{-}shell}$);

determining a global admittance of the body-shell at a point of attachment of the suspension system to the ($Y_{body\text{-}shell}$);

determining a global impedance of the suspension system expressed at the point of attachment to the body-shell ($Z_S$);

determining, while the vehicle is rolling, lockup loads of the suspension system at the point of attachment of the body-shell ($F_S^b$); and combining the global transfer function of the body-shell, the global admittance of the body-shell, the global impedance of the link system, and the lockup loads of the suspension system.

An advantage of this method lies in splitting the vehicle into two distinct components, the body-shell and the suspension system, which are studied independently of one another. Consequently, characterization of the body-shell can be done just once to predict a noise/comfort performance of the vehicle when the vehicle is equipped with an arbitrary suspension system.

The global transfer function of the body-shell ($T_{body\text{-}shell}$) and the global admittance of the body-shell ($Y_{body\text{-}shell}$) may be determined when stationary.

Advantageously, to determine the global transfer function of the body-shell, measurements are undertaken on the body-shell when stationary according to the following steps:

placing measurement devices inside the vehicle, the devices being able to record noise and vibration signals at m points previously determined in the cabin;

positioning the point of attachment of the suspension system with respect to the body-shell in a manner analogous to its position on the vehicle equipped with the suspension system (referred to herein as "at the level of" the body-shell), with the point of attachment at the level of the body-shell being free in displacement and rotation and being suspended using flexible elastic links;

applying an excitation at the point of attachment of the suspension system using an excitation system, the excitation being applied in predetermined directions corresponding to canonical excitations in the directions of the vehicle's reference frame;

obtaining a set of temporal data by recording, as temporal data for each excitation, a noise and vibration signal in the cabin of the vehicle together with, at the level of the excited point of attachment, an excitation signal;

translating the set of temporal data to a frequency domain using computer software; and referring the noise and vibration signals of the m points to a unit excitation in translation or rotation in the right-handed orthonormal reference frame of the vehicle to obtain a global transfer function of the body-shell.

Advantageously, when a point of attachment is not accessible, excitations are applied at geometric points specifically determined in relation to that point of attachment. In this case, a geometric transformation makes it possible to recalculate loads at that point of attachment on the basis of loads at the geometrically determined points.

Advantageously, the excitation system for exciting a point of attachment can include a vibrating pot.

Preferably, to determine the global admittance of the body-shell at the point of attachment of the suspension system to the body-shell, measurements are undertaken on the body-shell when stationary according to the following steps:

positioning the point of attachment of the suspension system with respect to the body-shell in a manner analogous to its position on the vehicle equipped with the suspension system, with the point of attachment at the level of the body-shell being free in displacement and rotation and being suspended using flexible elastic links;

equipping the point of attachment with vibration sensors, such as accelerometers, for measuring a vibratory level in translation and rotation of the point of attachment of the body-shell;

applying excitations to the point of attachment, using an excitation system, in predetermined directions corresponding to canonical excitations in the directions of the vehicle's reference frame;

obtaining a set of temporal data by recording, as temporal data for each excitation, an excitation signal at the level of the excited point of attachment and vibratory responses at the point of attachment;

translating the set of temporal data to the frequency domain using computer software; and determining the global admittance of the body-shell at the level of the point of attachment by taking a ratio between the vibratory responses at the point of attachment, in the directions of the vehicle's reference frame, and the excitation signal at the level of the excited point of attachment.

Advantageously, translational and rotational vibratory responses at the excited point of attachment are recorded.

Advantageously, when the point of attachment is not accessible, vibration sensors, such as accelerometers, are fitted and excitations are applied at geometric points specifically determined in relation to the point of attachment. In this case, a geometric transformation is used to recalculate vibratory responses at the point of attachment.

To determine the global impedance of the suspension system expressed at the point of attachment to the body-shell, measurements are made on the suspension system according to the following steps:

fitting the suspension system in place on a device equipped with a smooth cladding;

connecting the suspension system mechanically to a bench at the level of the point of attachment by way of connections, for example, using elastic wedges, which are flexible in relation to a rigidity of the suspension system, and such that the point of attachment is free to move in a given direction of translation or rotation, the bench being equipped with means for measuring displacements (translation and rotation) and loads (forces and moments) of the point of attachment of the suspension system;

applying an excitation at the point of attachment using an excitation system adapted for imposing kinematics of the point of attachment in a direction previously left free of motion;

performing a measurement of a displacement vector of the excited point of attachment and a measurement of a vector of resulting loads (forces and moments) at the point of attachment of the suspension system for each excitation at the point of attachment, for a set of degrees of freedom of the point of attachment, to obtain a set of temporal data;

translating the set of temporal data to a frequency domain using computer software; and determining the global impedance of the suspension system by taking a ratio between signals of forces and moments at the point of attachment and a vibratory level at the point of attachment for plural degrees of freedom of the point of attachment, such as for six degrees of freedom.

Advantageously, prior to the applying of the excitations, the suspension system is fitted in place on the device equipped with a smooth cladding under rolling conditions similar to those experienced by the vehicle.

Advantageously, the excitation system is adapted for imposing the kinematics at the point of attachment in the direction previously left free of motion without exciting other degrees of freedom of the point of attachment.

Preferably, the translational and rotational displacements at the point of attachment are measured, and the excitation system includes vibrating pots.

To invoke a translational degree of freedom at the point of attachment, the excitation system may include at least one vibrating pot positioned at the level of the point of attachment in a direction that one wishes to excite.

Advantageously, if the point of attachment is not accessible, vibrating pots are positioned in a symmetric manner with respect to the point of attachment by way of a suitable mounting and they are excited in phase.

To invoke a rotational degree of freedom at the point of attachment, it is possible to position at least two vibrating pots in a symmetric manner with respect to the point of attachment by way of a suitable mounting and to excite the at least two vibrating pots in phase-opposition.

To determine lockup loads of the suspension system at the level of the point of attachment, measurements are made on the suspension system according to the following steps:

fitting the suspension system in place on a rolling device that includes on its rolling surface at least one irregularity of predetermined dimension similar to an irregularity dimension from on-vehicle trials;

fixing the suspension system rigidly on a bench at the level of the point of attachment, the bench being equipped with a measurement device for measuring loads (forces and moments) at the point of attachment;

stressing the suspension system on the rolling device under rolling conditions identical to those experienced by the vehicle;

recording signals of the loads (forces and moments) at the point of attachment while rolling to obtain a set of temporal data; and translating the set of temporal data to a frequency domain using computer software.

Finally, to evaluate the noise/comfort performance of the vehicle equipped with the suspension system, the following operation is performed:

$$P = T_{body\text{-}shell} * [I + Z_S * Y_{body\text{-}shell}]^{-1} * F_S^b,$$

in which:
P is the vibroacoustic performance of the vehicle, in the cabin of the vehicle, and is a matrix of dimensions m, 1; m being a number of measurement points in the cabin;

$T_{body\text{-}shell}$ is the global transfer function of the body-shell, and is a matrix of dimensions m, n;

I is a unit or identity matrix of dimensions n, n; n being a number of predetermined directions of excitation of the point of attachment;

$Y_{body\text{-}shell}$ is the admittance of the body-shell, and is a square matrix of dimensions n, n;

$Z_S$ is the impedance of the suspension system, and is a square matrix of dimensions n, n; and $F_S^b$ corresponds to the lockup loads of the suspension system, and is a matrix of dimensions n, 1.

The noise/comfort performance of the vehicle takes the form of a matrix of dimension m*1, where each row is a vibratory or acoustic response at a point m of the cabin of the vehicle in the frequency domain.

An aspect of the invention also includes a method for predicting operational loads at a point of attachment of a vehicle that includes a body-shell and of a suspension system linked to the body-shell by at least one point of attachment, the vehicle rolling at a given speed V on a rolling device that includes on its rolling surface at least one irregularity of predetermined dimension, the method including:

determining a global admittance of a body-shell expressed at a point of attachment of a suspension system to the body-shell ($Y_{body\text{-}shell}$);

determining a global impedance of the suspension system expressed at the point of attachment ($Z_S$);

determining, while rolling, lockup loads of the suspension system at the point of attachment ($F_S^b$); and combining together the global admittance of the body-shell, the global impedance of the suspension system, and the lockup loads of the suspension system by performing the following operation:

$$F_S^{op} = [I + Z_S * Y_{body\text{-}shell}]^{-1} * F_S^b,$$

in which, for each frequency studied:
$F_S^{op}$ corresponds to operational loads at the point of attachment of the vehicle; it is a matrix of dimensions n, 1; n being the number of predetermined directions of excitation of the point of attachment of the vehicle;

I is a unit or square matrix of dimensions n, n;

$Y_{body\text{-}shell}$ is the admittance of the body-shell; it is a square matrix of dimensions n, n;

$Z_S$ is the impedance of the suspension system; it is a square matrix of dimensions n, n; and $F_S^b$ corresponds to the lockup loads of the suspension system; it is a matrix of dimensions n, 1.

The operational loads at the point of attachment of the vehicle take the form of a matrix of dimensions n, 1 where each row corresponds to a load or a moment at the point of attachment of the vehicle in a predetermined direction of the vehicle's reference frame in the frequency domain.

Knowledge of the operational loads makes it possible to sort suspension systems in relation to a mechanical behaviour of a specific body-shell.

The suspension system can advantageously reduce to a tire and wheel assembly.

Of course, experimental data may be substituted by digital data arising from a simulation of an experimental characterization.

BRIEF DESCRIPTION OF THE DRAWINGS

Exemplary embodiments are given in the following description, supplemented with FIGS. 1 to 14, of which:

FIGS. 2 (a) and (b) present a device for exciting a point of attachment, and for making it possible to measure a vibratory level at the point of attachment;

FIGS. 8 (a) and 8 (b) present graphs corresponding to an acoustic transfer of a body-shell between a right rear wheel centre and a microphone in a cabin in a front left area, in which graph (a) represents an amplitude of the acoustic transfer in a frequency domain, and graph (b) represents a phase of this acoustic transfer;

FIGS. 9 (a) and 9 (b) present graphs corresponding to an admittance of a body-shell at a level of a front left wheel centre, in which graph (a) represents an amplitude of the admittance expressed on a logarithmic scale in a frequency domain, and graph (b) represents a phase of this admittance;

FIGS. 10 (a) and 10 (b) present graphs corresponding to an impedance of a tire and wheel assembly at a wheel centre, in which graph (a) represents an amplitude of the impedance when stationary, expressed in a frequency domain, an graph (b) represents a phase of this impedance;

FIGS. 11 (a) and 11 (b) present graphs corresponding to lockup loads of a tire and wheel assembly, obtained at a wheel centre, in which graph (a) represents an autospectrum of the lockup loads in an X direction, expressed in a vehicle's reference frame, for this tire and wheel assembly, and graph (b) represents an autospectrum of the lockup loads in a Z direction for this tire and wheel assembly;

DETAILED DESCRIPTION OF EMBODIMENTS

Figure 1:
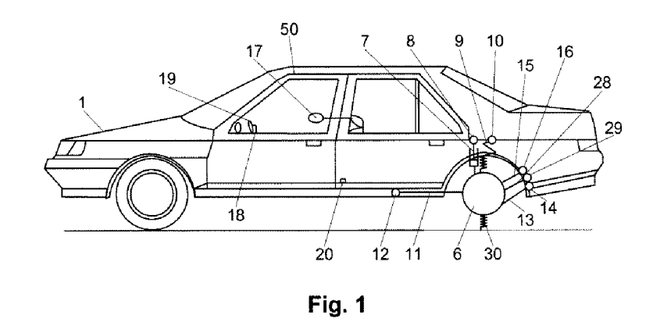
FIG. 1 presents an automobile body-shell used to obtain a global transfer function arising from a rear axle assembly, or a global admittance of the body-shell arising from the rear axle assembly.

In FIG. 1 there is shown a passenger vehicle 1, whose rear left tire and wheel assembly is dismantled, this corresponding to a body-shell 50.

Figure 3:
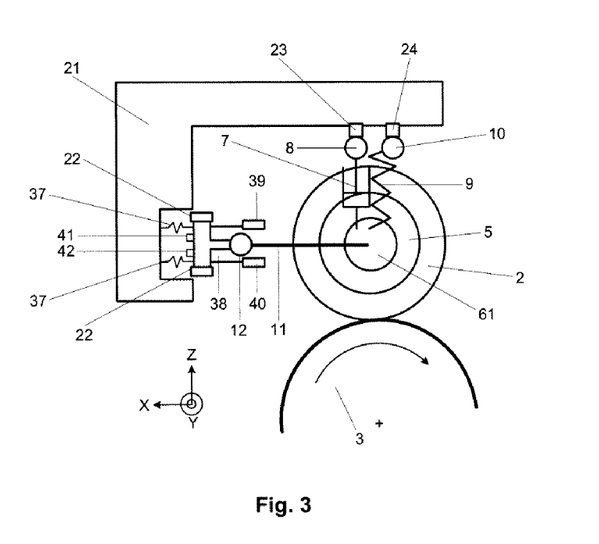
FIG. 3 presents a suspension system flexibly mounted at a level of at least one point of attachment on a rig.
Figure 4:
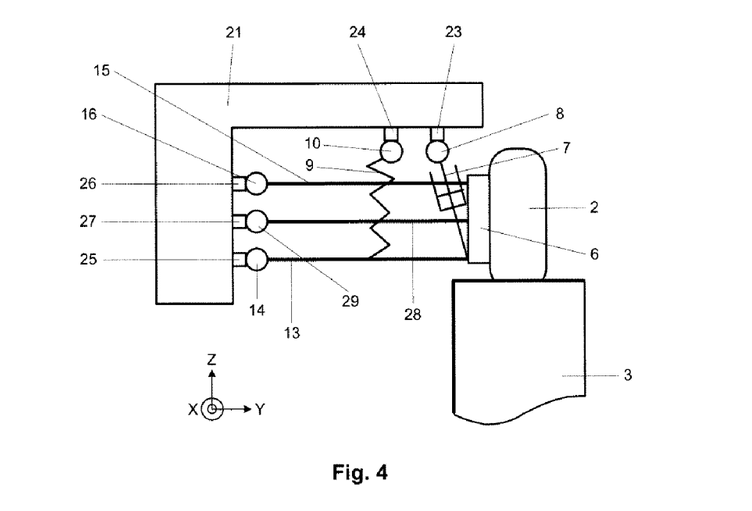
FIG. 4 presents, from another viewing angle, the suspension system of FIG. 3.

In FIGS. 3 and 4, a rear left tyre 2 rests on a flywheel 3 of diameter 1.6 m clad with a smooth surface cladding. Means, not shown, are provided to rotate the flywheel 3.

Figure 5:
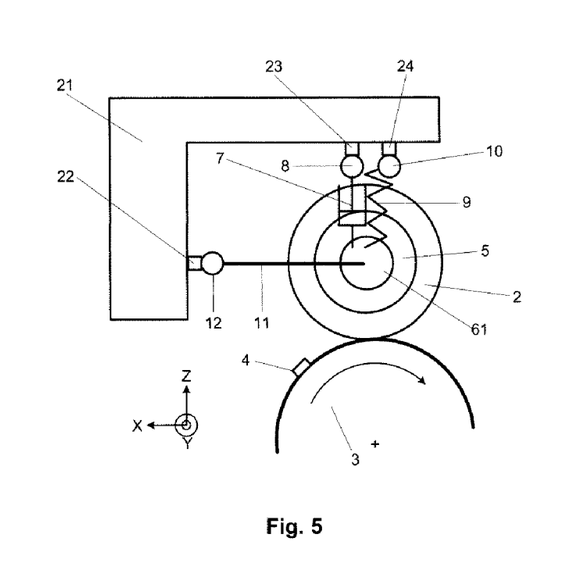
FIG. 5 presents a suspension system mounted rigidly on a rig.
Figure 6:
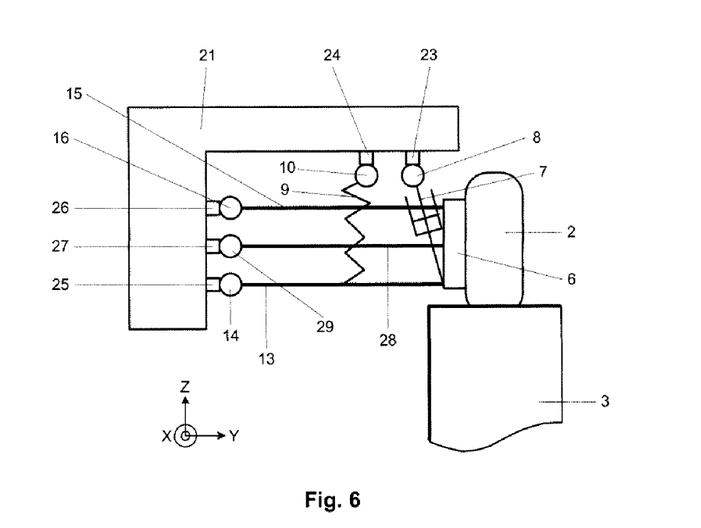
FIG. 6 presents, from another viewing angle, the suspension system of FIG. 5.

In FIGS. 5 and 6, the rear left tyre 2 rests on the smooth flywheel 3. A strip 4, of rectangular cross section of width 20 mm and height 10 mm, is disposed transversely on a surface of the flywheel 3 (that is, parallel to an axis of rotation of the flywheel 3). Means, not shown, are provided to rotate the flywheel 3.

Figure 7:
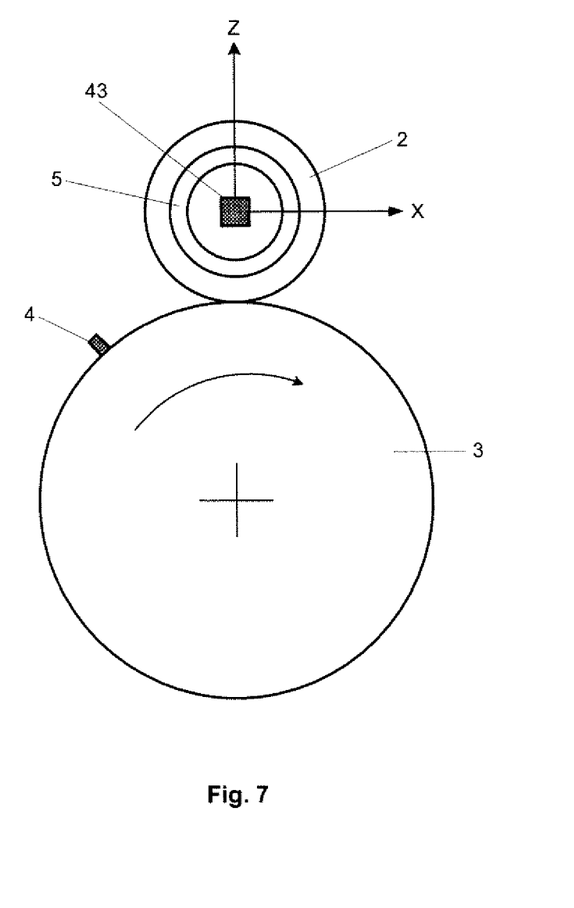
FIG. 7 presents a tyre mounted rigidly on its mounting wheel and bearing down on a rolling flywheel.

In a first example, presented by means of FIGS. 1 and 7, a suspension system is limited to the rear left tyre 2 mounted on a wheel 5.

In a second example, presented by means of FIGS. 3, 4, 5, and 6, the suspension system includes in particular the following elements: the rear left tyre 2 mounted on the wheel 5; a hub-carrier/hub assembly 6 with a fixed hub 61 and a hub carrier mobile in rotation 62; a rear left damper 7; an upper attachment 8 of the rear left damper 7; a rear left spring 9; a filtering part 10 of the rear left spring 9; a rear left longitudinal arm 11; an elastic articulation 12 for connecting the rear left longitudinal arm 11 to the body-shell 50; a rear left lower arm 13; an elastic articulation 14 for connecting the rear left lower arm 13 to the body-shell 50; a rear left upper arm 15; an elastic articulation 16 for connecting the rear left upper arm 15 to the body-shell 50; a rear left pincer tie-rod 28; a ball joint 29 ensuring a linkage between the tie-rod 28 and the body-shell 50. Various secondary parts are not represented in the figures (e.g., screws, nuts, ball joints, roller bearings, elastic articulations, etc.).

The vehicle 1 is equipped inside its cabin with, in particular:

a microphone 17 located at a level of a right ear of a driver of the vehicle 1, for recording noise or an acoustic level; and a three-directional accelerometer 18 placed on a steering wheel 19 of the vehicle 1, and a three-directional accelerometer 20 placed on one of plural runners of a driver's seat for vibratory recordings in the cabin.

A method according to an aspect of the present invention makes it possible to predict, for a chosen speed V and under conditions of rolling on the flywheel 3 provided with an irregularity or obstacle 4, a noise/comfort performance of the vehicle 1.

To obtain inputs of the suspension system, there is undertaken first of all, as represented in FIG. 1, identification of a transfer function $T_{body\text{-}shell}$ of the body-shell 50 and of an admittance $Y_{body\text{-}shell}$ of the body-shell 50 at a point of attachment. The body-shell 50 is suspended at the level of the point of attachment of the tire and wheel assembly by way of flexible links 30. Consequently, the point of attachment is free in displacement and rotation and is in a position analogous to its position on the vehicle 1 when the vehicle 1 is equipped with the tire and wheel assembly.

Figure 2:
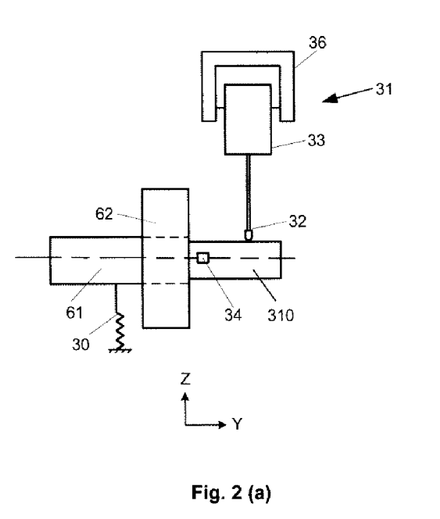

To apply an excitation and measure a vibratory level at the point of attachment, as represented in FIG. 2, an excitation system 31 is used. This system 31 includes at least one excitation vibrating pot 33, each put in place in a predetermined position and direction by means of a positioning device 36. An impedance head 32 at an end of the vibrating pot 33 records an excitation signal. In the example of FIG. 2, the impedance head 32 at the end of the vibrating pot 33 is applied against a part 310 extending in line with the fixed hub 61. This point of application of an excitation is offset from the point of attachment of the tire and wheel assembly, i.e., the wheel centre, but the point of application of the excitation, or "excitation point," is well determined in relation to the point of attachment, and a geometric transformation makes it possible to recalculate loads at the point of attachment on the basis of loads at the excitation point. The device 36 positions the vibrating pot 33 in such a way that the point of attachment is excited in one of the directions corresponding to canonical excitations in the directions of the vehicle's reference frame.

The excitation system 31, based on vibrating pots 33, is designed in such a way that its first resonant frequency does not lie in the span or range of frequencies at which the measurements are carried out.

For each excitation, the noise and vibrations in the cabin of the vehicle 1 are recorded by means of the microphone 17 and the accelerometers 18 and 20, as is the excitation signal by means of the impedance head 32.

A set of temporal data obtained from the measurements is then translated to a frequency domain with the aid of computer software well known to a person skilled in the art, and, by comparing noise and vibration signals for various points of the body-shell 50 to a unit excitation in translation or rotation in a right-handed orthonormal reference frame of the vehicle 1, a global transfer function $T_{body-shell}$ of the body-shell 50 is obtained.

Figure 8A:
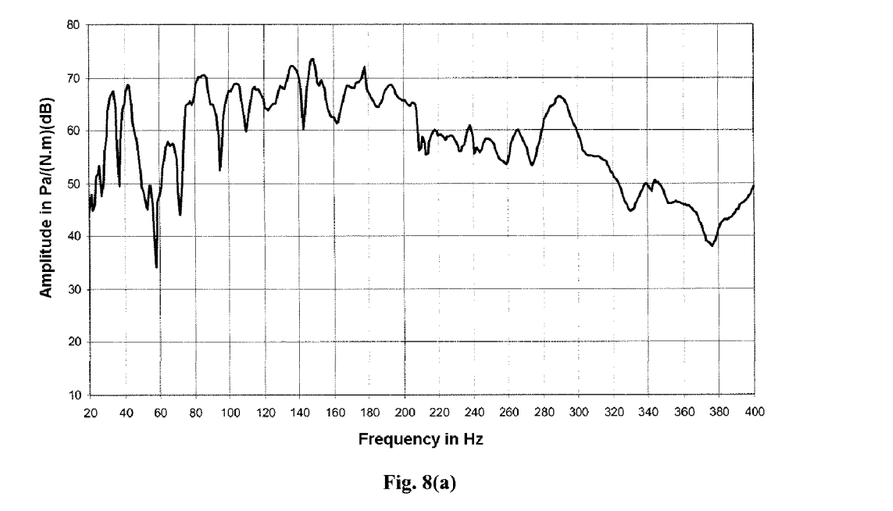
Figure 8B:
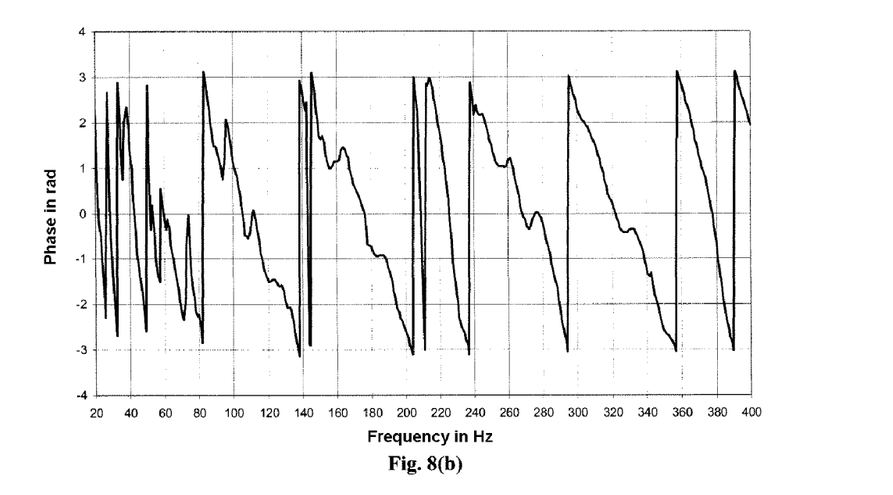

FIGS. 8 (a) and 8 (b) represent an experimental example of an acoustic transfer function $T_{body-shell}$ of a vehicle body-shell 50. This example corresponds to an acoustic transfer between a right rear wheel centre and a microphone in the cabin at a front left area for an excitation in terms of a moment about the X axis of the vehicle reference frame. The measurement is done when stationary. In this particular case, the body-shell 50 is that of an AUDI A4 Saloon. A geometric position of a wheel centre in relation to the body-shell 50 is similar to that which the wheel centre would have on the vehicle 1. The graph in FIG. 8 (a) corresponds to an amplitude of an acoustic transfer in the frequency domain, and the graph in FIG. 8 (b) represents a phase of this transfer.

To determine an admittance $Y_{body-shell}$ of the body-shell 50 at a point of attachment, the previously described arrangement is supplemented by placing, as indicated in FIGS. 2 (a) and (b), accelerometers 34 and 35, for example, on the part 310. The positions of the accelerometers 34 and 35 are well determined with respect to the point of attachment (i.e., the wheel centre) of the tire and wheel assembly, so as to make it possible to recalculate vibratory levels at a level of the point of attachment.

As previously, excitations are applied at the point of attachment by means of the excitation system 31 in predetermined directions, the excitations corresponding to canonical excitations in the directions of the vehicle's reference frame; for each excitation, an excitation signal and responses in terms of acceleration at the point of attachment are recorded; a set of temporal data is obtained and is translated to a frequency domain with the aid of computer software, and the admittance $Y_{body-shell}$ of the body-shell 50 at the level of the point of attachment is determined by taking a ratio between translational and rotational accelerations in various directions of the vehicle's reference frame at the point of attachment and an excitation signal at the level of the excited point of attachment.

Figure 9A:
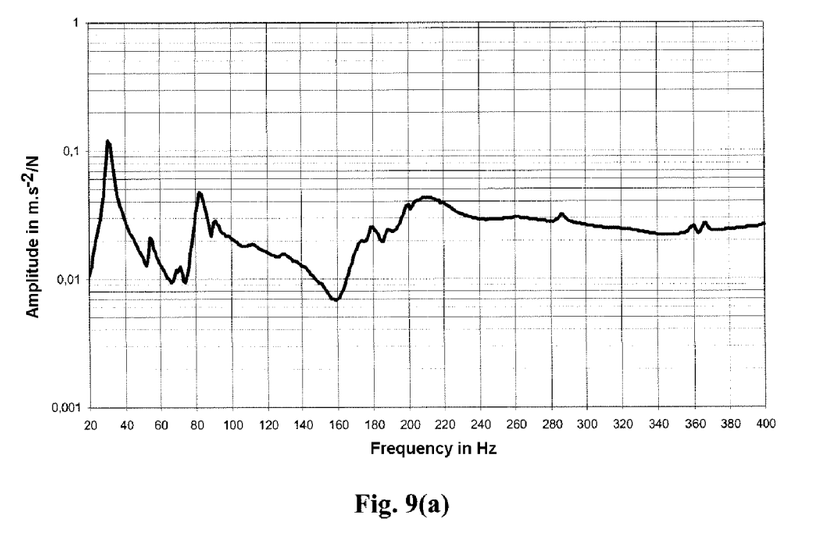
Figure 9B:
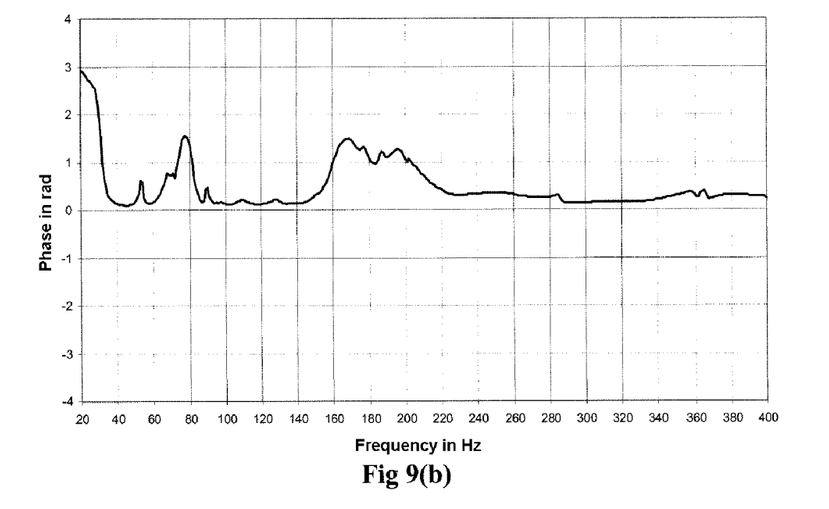

FIGS. 9 (a) and (b) present an experimental example of an admittance $Y_{body-shell}$ of the body-shell 50 at the level of a front left wheel centre for an excitation in the X direction of the vehicle reference frame. The measurement is done when stationary, and a geometric position of the wheel centre in relation to the body-shell 50 is similar to that which the wheel centre would have on the vehicle 1. In this particular case, the body-shell 50 is that of an AUDI A4 Saloon. The graph in FIG. 9 (a) corresponds to the amplitude of the admittance expressed in a logarithmic scale in the frequency domain, and the graph in FIG. 9 (b) represents the phase of this same admittance.

To obtain a measurement of a global impedance $Z_S$ of a suspension system at a level of a given point of attachment, the suspension system, which includes elements determined beforehand, is mounted by its points of attachment on a rig 21. Such a mounting in the case of a complete suspension system is schematically presented in FIGS. 3 and 4. The tyre 2 rolls on the flywheel 3 provided with a smooth cladding and supports, at its contact surface, loadings identical to those transmitted by the vehicle 1.

FIG. 3 shows directions denoted X and Z to be in the plane of this figure (a Y direction is perpendicular to the plane of this figure and parallel to a direction of an axis of rotation of the flywheel 3). FIG. 4 shows the perpendicular directions Y and Z in the plane of this figure.

The rig 21 is designed in such a way that its first resonant frequency does not lie in the range of frequencies at which the measurements are carried out.

At the level of the excited point of attachment (in this example, at the attachment of the elastic articulation 12 for connection between the rear left longitudinal arm 11 to the body-shell 50), a mechanical device 38 makes it possible to apply excitations in terms of moment with the aid of the vibrating pots 39 and 40. The device 38 is connected to the rig 21 by flexible links 37.

This device 38 is equipped, on the one hand, with accelerometers 41, 42 for measuring a displacement vector (translation and rotation) of the point of attachment, and, on the other hand, with load cells 22 for recording at this point of attachment the loads and moments in three perpendicular directions.

The mechanical device 38 is designed in such a way that its first resonant frequency does not lie in the range of frequencies at which the measurements are carried out.

At each of the other five points of attachment of the suspension system to the rig 21 are placed load cells 23, 24, 25, 26, 27 for recording at these points the loads and the moments in three perpendicular directions.

The measurements on the suspension system are carried out at the same speed as that used on the vehicle 1 when measuring the noise/comfort performance.

The excitation at each point of attachment shown makes it possible to impose kinematics at the point of attachment in a direction left free of motion (e.g., rotation about the Y axis) without exciting other degrees of freedom of the point of attachment.

The manipulations or excitations include imposing a moment corresponding to a rotation about the Y axis at the point of attachment of the articulation 12 and measuring a corresponding displacement vector of the point of attachment as well as measuring resulting loads at the levels of the points of attachment of the suspension system.

After having performed these measurements for the set of degrees of freedom of each point of attachment (by means of suitable mountings similar to that presented in FIGS. 3 and 4), a set of temporal data is obtained and is translated to the frequency domain, and the impedance of the suspension system is determined by taking a ratio between force and moment signals of the point of attachment and a level of displacement of the point of attachment.

Figure 10A:
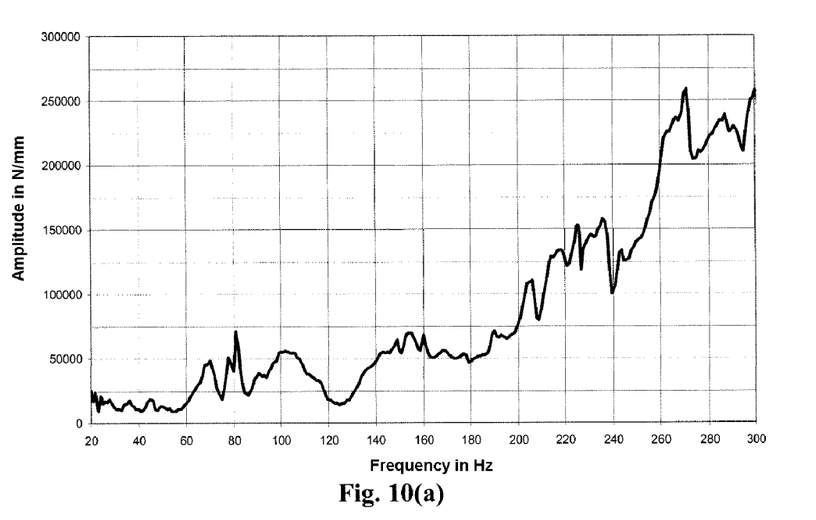
Figure 10B:
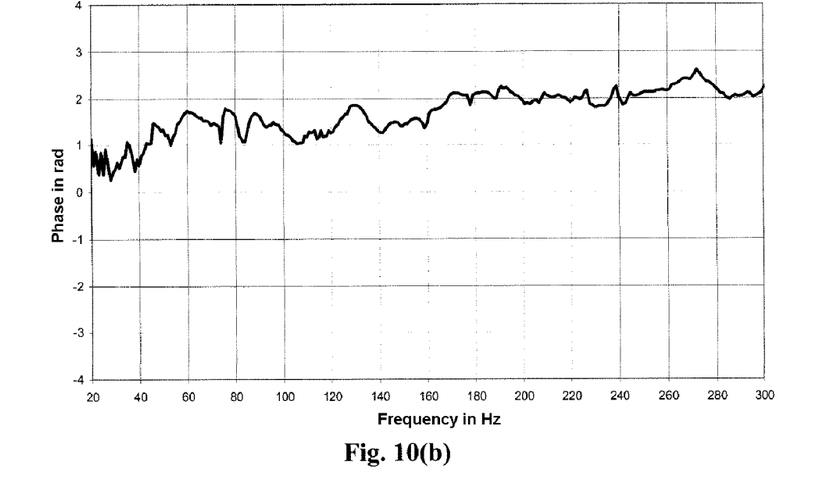

FIGS. 10 (a) and (b) present an experimental example of an impedance $Z_S$ of a suspension system at a wheel centre in the case of a suspension system limited to a tire and wheel assembly. The example corresponds to an excitation in the Y direction expressed in the vehicle's reference frame. In this particular case, it involves a Michelin Primacy HP tyre of dimension 225/55 R16 95W inflated to 3.3 bar mounted on an alloy rim of reference 8E0 601 025 C of dimension 7J16 H2 ET 42. The graph of FIG. 10 (a) corresponds to an amplitude of the impedance when stationary expressed in the frequency domain, and the graph of FIG. 10 (b) represents a phase of this impedance.

FIGS. 5 and 6 present a mounting of a suspension system on a rig 21, making it possible to obtain a measurement of lockup loads of the suspension system at the levels of the points of attachment. The measurements are performed with the tyre 2 rolling on the flywheel 3 provided with an obstacle 4 identical to that used on trials on the vehicle 1 rolling by way of its suspension system on the same flywheel 3 equipped with the same obstacle 4.

FIG. 5 shows the directions denoted X and Z to be in the plane of the figure (the Y direction is perpendicular to the plane of this figure and is parallel to an axis of rotation of the flywheel 3). FIG. 6 shows the perpendicular directions Y and Z in the plane of the figure.

The rig 21 is designed in such a way that its first resonant frequency does not lie in the range of frequencies at which the measurements are carried out.

At each of the six points of attachment of the suspension system to the rig 21 are placed load cells 22, 23, 24, 25, 26, 27 for recording at these points the loads and the moments in three perpendicular directions.

The measurements on the suspension system are carried out at the same speed as that used on the vehicle 1 when measuring the noise/comfort performance.

To obtain a measurement of lockup loads of the suspension system corresponding to the tire and wheel assembly only at the level of the wheel centre, FIG. 7 shows that the tire and wheel assembly is mounted at the level of the wheel centre on a rig equipped with a dynamometric hub 43. The tyre 2 rolls on a flywheel 3 provided with an obstacle 4 identical to that used on trials on the vehicle 1 rolling by way of its tire and wheel assembly on the same flywheel 3 equipped with the same obstacle 4.

Of course, what has been described as being carried out on a rolling means of a flywheel type may be carried out on a rolling machine reproducing rolling conditions much like plane ground (such as a "flat belt" machine, in particular).

Figure 11A:
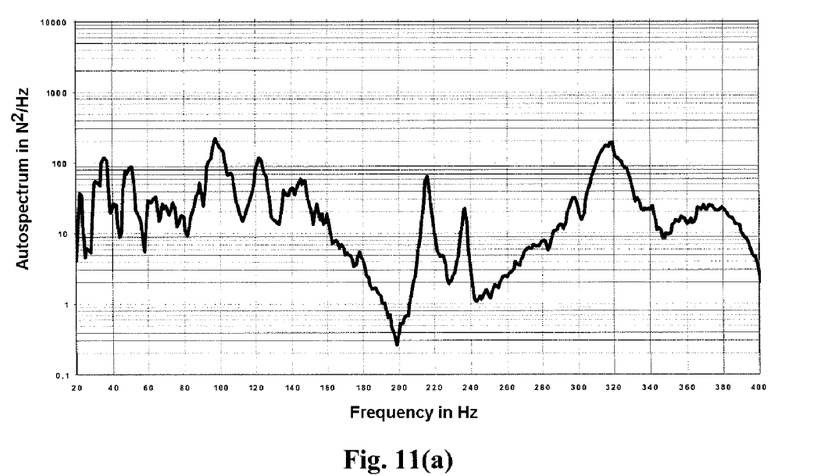
Figure 11B:
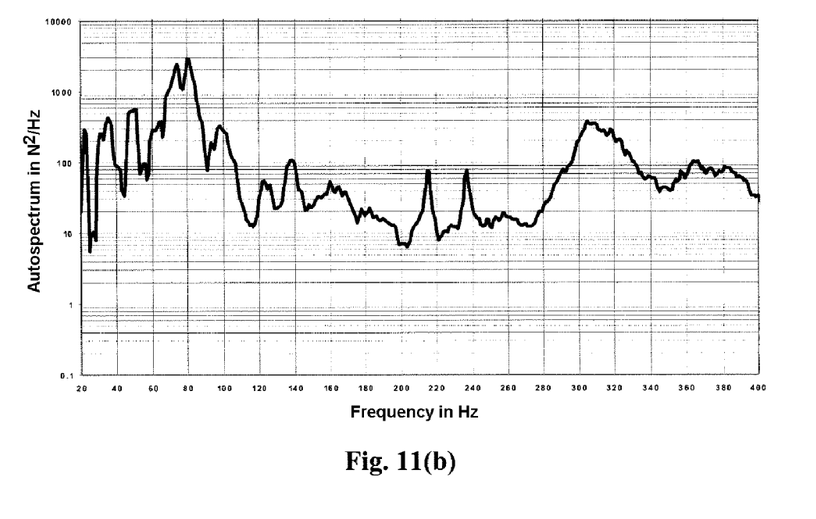

FIGS. 11 (a) and 11 (b) correspond to lockup loads of the tire and wheel assembly obtained at a wheel centre on the basis of a measurement on a rollway at a mean speed of 80 Km/h on macrorough ground, that is, on ground exhibiting a plurality of irregularities or obstacles. In this particular case, the tire and wheel assembly includes a Michelin Primacy HP casing (tire) of dimension 225/55 R16 95W inflated to 3.3 bar mounted on an alloy rim of reference 8E0 601 025 C of dimension 7J16 H2 ET 42. The graph of FIG. 11 (a) corresponds to an autospectrum of lockup loads in the X direction expressed in the vehicle's reference frame, and the graph of figure (b) represents an autospectrum of loads in the Z direction for this same tyre.

To obtain a prediction of a noise/comfort performance inside a cabin for a given suspension system, P, the global transfer function of the body-shell 50, the global admittance of the body-shell 50, the global impedance of the suspension system, and the lockup loads of the suspension system are combined together according to the following formula:

$$P = T_{body\text{-}shell} * [I + Z_S * Y_{body\text{-}shell}]^{-1} * F_S^b.$$

Figure 12:
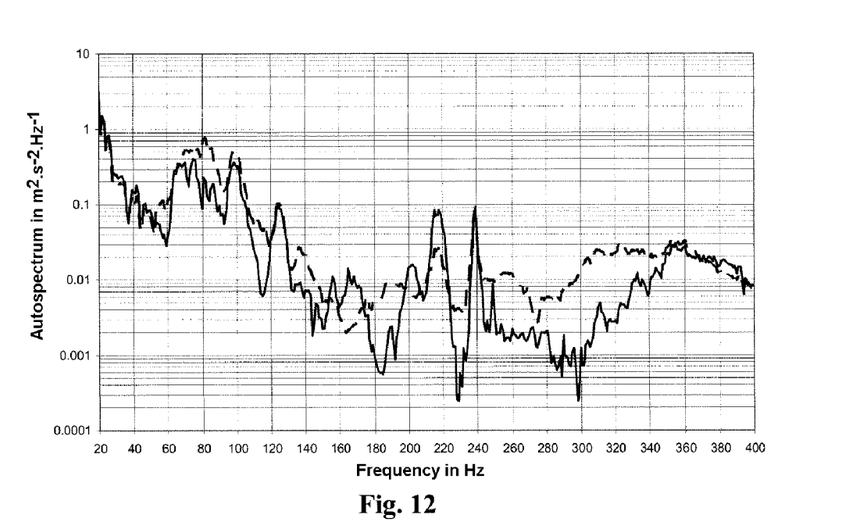
FIG. 12 presents a comparison of a vibratory level on a vehicle only a rear right wheel of which is rolling, at a mean speed of 80 Km/h, on macrorough ground identical to that used in measurements of the lockup loads; this figure represents a vibratory autospectrum of the vehicle in the Z direction at a particular geometric point; the solid or continuous line depicts the vibratory level synthesized by a method set forth herein; the dashed line corresponds to a direct measurement by an accelerometer.
Figure 13:
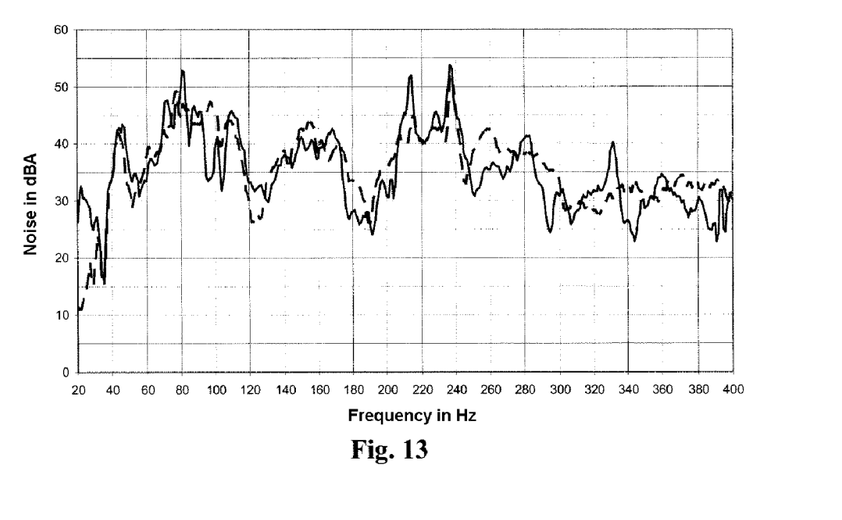
FIG. 13 presents a comparison of an acoustic level on a vehicle only a rear right wheel of which is rolling, at a mean speed of 80 Km/h, on macrorough ground identical to that used in measurements of the lockup loads; this figure represents an acoustic spectrum of a microphone inside the vehicle situated at a rear right area; the solid or continuous line depicts noise synthesized by a method set forth herein; the dashed line corresponds to a direct measurement by the microphone.

FIG. 12 represents a comparison of a vibratory level of a vehicle only a rear right wheel of which is rolling, at a mean speed of 80 Km/h, on macrorough ground identical to that used in the measurements of the lockup loads. The vehicle is equipped at the rear right with a tire and wheel assembly that includes a Michelin Primacy HP casing of dimension 225/55 R16 95W inflated to 3.3 bar mounted on an alloy rim of reference 8E0 601 025 C of dimension 7J16 H2 ET 42. FIG. 13 represents a vibratory autospectrum of the vehicle in the Z direction at a particular geometric point.

The dashed curve corresponds to a direct measurement in the cabin by means of accelerometers, and the solid curve corresponds to a prediction resulting from a combination of various measurements, such as those described above.

FIG. 13 supplements the results shown in FIG. 12 by representing a comparison of an acoustic level under the same operational conditions. This figure represents an acoustic spectrum of a microphone inside the vehicle situated at the rear right area. As previously, the dashed curve corresponds to a direct measurement in the cabin by means of a microphone, and the solid curve corresponds to a prediction resulting from a combination of various above-described measurements.

As can be seen from the figures, a similarity between the experimental and predicted curves demonstrates the whole of the benefit of the prediction method described.

It should be noted that the data necessary for the combination corresponding to the formula $P = T_{body\text{-}shell} * [I + Z_S * Y_{body\text{-}shell}]^{-1} * F_S^b$ may be obtained by experimental means as described above, but also in whole or in part by digital data arising from a simulation of the experimental characterization. This singularly enhances the benefit of this method for predicting the noise-comfort performance in the cabin of a given body-shell equipped with a given suspension system.

One of the aspects of the invention makes it possible to provide, for a chosen speed V and under the conditions of rolling on the flywheel 3 provided with an irregularity or obstacle 4, operational loads at a point of attachment of the vehicle 1.

These operational loads may be obtained by combining an admittance of the body-shell expressed at a point of attachment of a suspension system to a body-shell, i.e., $Y_{body\text{-}shell}$ an impedance of the suspension system expressed at the point of attachment, i.e., $Z_S$, and lockup loads of the suspension system at the point of attachment, i.e., $F_S^b$, by applying the formula:

$$F_S^{op} = [I + Z_S * Y_{body\text{-}shell}]^{-1} * F_S^b.$$

Figure 14:
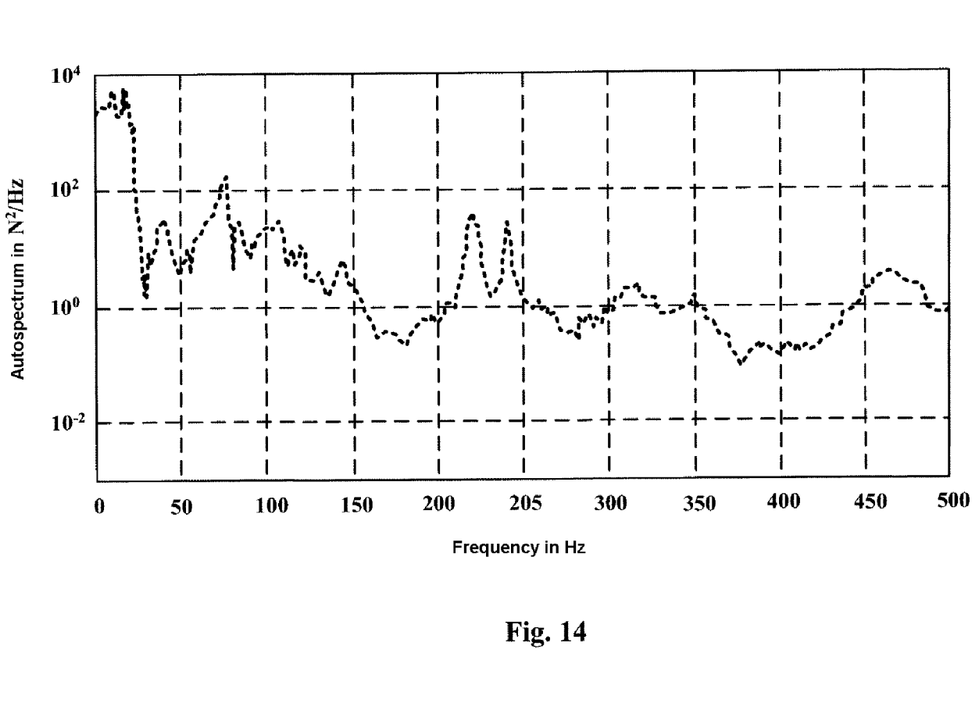
FIG. 14 presents operational loads obtained by combining quantities similar to those illustrated in FIGS. 9 (a) and (b), FIGS. 10 (a) and (b), and FIGS. 11 (a) and (b); this figure represents an autospectrum of a load in the Z direction at the level of a wheel centre.

FIG. 14 presents an exemplary prediction of an operational load at a point of attachment of a vehicle. This curve is obtained by combining experimental results similar to those presented in FIGS. 9 (a) and (b), 10 (a) and (b), and 11 (a) and (b). This curve represents an autospectrum of the operational load in the Z direction at the level of the wheel centre.

The invention is not limited to the examples described and represented herein, and various modifications can be made thereto without departing from the scope thereof defined by the appended claims.

The invention claimed is:

1. A method for predicting noise comfort performance corresponding to an acoustic level or vibratory level or both in a cabin of a vehicle with a body-shell and a suspension system linked to the body-shell by at least one point of attachment, the vehicle rolling at a given speed V on a rolling device that includes on its rolling surface at least one irregularity of a predetermined dimension, the method comprising:

determining, using a computer, a global transfer function ($T_{body-shell}$) of the body-shell for a point of attachment to the cabin;

determining a global admittance ($Y_{body-shell}$) of the body-shell for a point of attachment of the suspension system to the body-shell;

determining a global impedance ($Z_S$) of the suspension system for the point of attachment to the body-shell;

determining, while rolling, lockup loads ($F^S_b$) of the suspension system at the point of attachment to the body-shell; and combining together the global transfer function of the body-shell, the global admittance of the body-shell, the global impedance of the suspension system, and the lockup loads of the suspension system to obtain a prediction of a noise comfort performance (P) inside the cabin, wherein, to predict the noise comfort performance of the vehicle equipped with the suspension system, a formula of: $P=T_{body-shell}*[I+Z_{S}*Y_{body-shell}]^{-1}*F^S_b$ is calculated, in which, for each frequency studied: P is a comfort performance of the vehicle in the cabin, and is a matrix of dimensions m, 1, with m being a number of measurement points in the cabin; $T_{body-shell}$ is the global transfer function of the body-shell, and is a matrix of dimensions m, n; I is a unit matrix of dimensions n, n, n being a number of predetermined directions of excitation of the point of attachment; $Y_{body-shell}$ is the global admittance of the body-shell, and is a square matrix of dimensions n, n; $Z_S$ is the global impedance of the suspension system, and is a square matrix of dimensions n, n; and $^S_b$ corresponds to the lockup loads of the suspension system, and is a matrix of dimensions n, 1.

2. The method according to claim 1, wherein the global transfer function ($T_{body-shell}$) of the body-shell and the global admittance ($Y_{body-shell}$) of the body-shell are determined when stationary.

3. The method according to claim 1, wherein, to determine the global transfer function of the body-shell, measurements are made on the body-shell when stationary by:

recording noise and vibration signals at m points previously determined in the cabin using recording devices placed inside the vehicle;

positioning the point of attachment of the suspension system with respect to the body-shell in a manner analogous to a position the suspension system would have on the vehicle; the point of attachment at a level of the body-shell being free in displacement and rotation and being suspended using flexible elastic links;

applying excitations at the point of attachment of the suspension system using an excitation system, the excitation being applied in predetermined directions corresponding to excitations in directions of a reference frame of the vehicle;

obtaining a set of temporal data by, for each excitation, recording the noise and vibration signals in the cabin of the vehicle together with, at the level of the point of attachment, an excitation signal;

translating the set of temporal data to a frequency domain using computer software; and obtaining the global transfer function of the body-shell by referring the noise and vibration signals of m various points of the cabin to a unit excitation in translation or rotation in a right-handed orthonormal reference frame.

4. The method according to claim 3, wherein, when the point of attachment is not accessible, excitations are applied at geometric points determined in relation to the point of attachment, and loads at the point of attachment are calculated using a geometric transformation based on loads at the geometric points.

5. The method according to claim 1, wherein, to determine the global admittance of the body-shell for the point of attachment of the suspension system to the body-shell, measurements are made on the body-shell when stationary by:

positioning the point of attachment of the suspension system with respect to the body-shell in a manner analogous to a position the suspension system would have on the vehicle; the point of attachment at a level of the body-shell being free in displacement and rotation and being suspended using flexible elastic links;

equipping the point of attachment with vibration sensors for measuring a vibratory level of the point of attachment of the body-shell;

applying excitations to the point of attachment using an excitation system, the excitations being applied in predetermined directions corresponding to excitations in directions of a reference frame of the vehicle;

obtaining a set of temporal data by, for each excitation, recording an excitation signal at the level of the point of attachment and recording vibratory responses at the point of attachment;

translating the set of temporal data to a frequency domain using computer software; and obtaining the global admittance of the body-shell at the level of the point of attachment by calculating a ratio between the vibratory responses in the directions of the reference frame of the vehicle at the point of attachment and the excitation signal at the level of the point of attachment.

6. The method according to claim 5, wherein translational and rotational vibratory responses of the point of attachment are recorded.

7. The method according to claim 5, wherein, when the point of attachment is not accessible, vibration sensors are fitted to and excitations are applied at geometric points determined in relation to the point of attachment, and vibratory levels and loads at the point of attachment are calculated using a geometric transformation based on loads at the geometric points.

8. The method according to claim 1, wherein, to determine the global impedance of the suspension system for the point of attachment to the body-shell, measurements are made on the suspension system by: arranging the suspension system in place on a device equipped with a smooth cladding; mechanically connecting the suspension system to a bench at the point of attachment by way of connections that are flexible in relation to a rigidity of the suspension system, the bench being equipped with sensors for measuring displacements and measuring forces and moments of the point of attachment of the suspension system, in such a way that the point of attachment is free to move in a direction of translation or rotation; applying excitations at the point of attachment using an excitation system adapted for imposing kinematics at the point of attachment in a direction previously left free of motion; obtaining a set of temporal data by, for each excitation at the point of attachment of the suspension system, measuring a displacement vector of the point of attachment, during excitation, and measuring a vector of resulting loads at the point of attachment, for a set of degrees of freedom of the point of attachment; translating the set of temporal data to a frequency domain using computer software; and obtaining the global impedance of the suspension system by calculating a ratio between signals of forces and moments at the point of attachment and a vibratory level at the point of attachment for plural degrees of freedom of the point of attachment.

9. The method according to claim 8, wherein the suspension system, prior to the applying of the excitations, is arranged in place on the device equipped with the smooth cladding under rolling conditions similar to those experienced by the vehicle.

10. The method according to claim 8, wherein the excitation system is adapted for imposing the kinematics at the point of attachment in the direction previously left free of motion without exciting other degrees of freedom of the point of attachment.

11. The method according to claim 3, wherein the excitation system includes vibrating pots.

12. The method according to claim 1, wherein, to determine the lockup loads of the suspension system at the point of attachment, measurements are made on the suspension system by:
    arranging the suspension system in place on a rolling device that includes on its rolling surface at least one irregularity of predetermined a dimension similar to used in on-vehicle trials;
    rigidly fixing the suspension system on a bench at the point of attachment, the bench being equipped with a sensor for measuring forces and moments at the point of attachment;
    stressing the suspension system on the rolling device under rolling conditions identical to those used in the on-vehicle trials;
    obtaining a set of temporal data by recording, while rolling, signals of the forces and moments at the point of attachment; and
    translating the set of temporal data to a frequency domain using computer software.

13. The method according to claim 1, wherein the suspension system is a tire and wheel assembly.

14. The method according to claim 1, wherein the global transfer function of the body-shell, the global admittance of the body-shell, the global impedance of the suspension system, and the lockup loads of the suspension system are digital data derived from a simulation of an experimental characterization.

15. A method for predicting operational loads at a point of attachment of a vehicle that includes a body-shell and a suspension system linked to the body-shell by at least one point of attachment, the vehicle rolling at a given speed V on a rolling device that includes on its rolling surface at least one irregularity of a predetermined dimension, comprising:
    determining, using a computer, an admittance ($Y_{body\text{-}shell}$) of the body-shell for the point of attachment of the suspension system to the body-shell;
    determining an impedance ($Z_S$) of the suspension system for the point of attachment;
    determining, while rolling, lockup loads ($F^s_b$) of the suspension system at the point of attachment; and
    combining together the admittance of the body-shell, the impedance of the suspension system, and the lockup loads of the suspension system to predict operational loads at the point of attachment of the vehicle, wherein, to predict the operational loads at the point of attachment of the vehicle equipped with the suspension system, a formula of: $F_S^{op}=[I+Z_S*Y_{body\text{-}shell}]^{-1}*F_S^b$ is calculated, in which, for each frequency studied: $F_S^{op}$ corresponds to the operational loads at the point of attachment of the vehicle, and is a matrix of dimensions n, 1, n being a number of predetermined directions of excitation of the point of attachment of the vehicle; I is a unit matrix of dimensions n, n; $Y_{body\text{-}shell}$ is the admittance of the body-shell, and is a square matrix of dimensions n, n; $Z_S$ is the impedance of the suspension system, and is a square matrix of dimensions n, n; and $F_S^b$ corresponds to the lockup loads of the suspension system, and is a matrix of dimensions n, 1.

16. The method according to claim 15, wherein the suspension system is a tire and wheel assembly.

17. The method according to claim 15, wherein the admittance of the body-shell, the impedance of the suspension system, and the lockup loads of the suspension system are digital data derived from a simulation of an experimental characterization.

* * * * *